US012342145B2

(12) United States Patent
Wang et al.

(10) Patent No.: US 12,342,145 B2
(45) Date of Patent: Jun. 24, 2025

(54) SOUND GENERATING DEVICE MODULE

(71) Applicant: GOERTEK INC., Shandong (CN)

(72) Inventors: Qizhong Wang, Shandong (CN); Zongjun Mou, Shandong (CN)

(73) Assignee: GOERTEK INC., Weifang (CN)

( * ) Notice: Subject to any disclaimer, the term of this patent is extended or adjusted under 35 U.S.C. 154(b) by 247 days.

(21) Appl. No.: 18/042,042

(22) PCT Filed: Nov. 7, 2020

(86) PCT No.: PCT/CN2020/127366
§ 371 (c)(1),
(2) Date: Feb. 17, 2023

(87) PCT Pub. No.: WO2022/036874
PCT Pub. Date: Feb. 24, 2022

(65) Prior Publication Data

US 2024/0031743 A1 Jan. 25, 2024

(30) Foreign Application Priority Data

Aug. 20, 2020 (CN) ......................... 202010840163.6

(51) Int. Cl.
*H04R 9/06* (2006.01)
*H04R 1/24* (2006.01)
(Continued)

(52) U.S. Cl.
CPC ................. *H04R 9/06* (2013.01); *H04R 1/24* (2013.01); *H04R 9/025* (2013.01); *H04R 9/045* (2013.01)

(58) Field of Classification Search
CPC .......... H04R 9/025; H04R 9/063; H04R 1/24; H04R 1/025; H04R 7/24; H04R 9/045;
(Continued)

(56) References Cited

U.S. PATENT DOCUMENTS 7,142,686 B2 * 11/2006 Furuya .................. H04R 9/063 381/396
2003/0053651 A1 * 3/2003 Koura ...................... H04R 9/04 381/405
(Continued)

FOREIGN PATENT DOCUMENTS

CN 108449700 A 8/2018
CN 207995330 U 10/2018
(Continued)

OTHER PUBLICATIONS

International Search Report from International Application No. PCT/CN2020/127366 mailed May 19, 2021.

*Primary Examiner* — Carolyn R Edwards
*Assistant Examiner* — Julie X Dang
(74) *Attorney, Agent, or Firm* — Shih IP Law Group, PLLC

(57) ABSTRACT

The present application discloses a sound generating device module, comprising: a housing having a cavity therein; a frame fixedly provided in the cavity, a high-pitch sound generating unit and a low-pitch sound generating unit are respectively provided on two opposite sides of the frame; a baffle plate is provided on a side of the housing corresponding to the high-pitch sound generating unit, and the baffle plate and the housing together form a side sound output port corresponding to the high-pitch sound generating unit; the sound generating device module is configured to form a front sound output structure for the low-pitch sound generating unit; and a reinforcement plate is provided in the frame, and the reinforcement plate is interposed between the high-pitch sound generating unit and the low-pitch sound generating unit.

10 Claims, 1 Drawing Sheet

(51) Int. Cl.
*H04R 9/02* (2006.01)
*H04R 9/04* (2006.01)

(58) Field of Classification Search
CPC ........ H04R 7/18; H04R 7/04; H04R 2400/11; H04R 9/06
See application file for complete search history.

(56) References Cited

U.S. PATENT DOCUMENTS

| | | | | |
|---|---|---|---|---|
| 2004/0071303 | A1* | 4/2004 | Furuya .................. | H04M 1/035 379/433.02 |
| 2006/0120551 | A1* | 6/2006 | Enomoto ............... | H04R 9/025 381/396 |
| 2009/0136065 | A1* | 5/2009 | Yano ........................ | H04R 9/10 381/186 |
| 2013/0121522 | A1 | 5/2013 | Flavignard et al. | |
| 2014/0363035 | A1 | 12/2014 | Zhao et al. | |
| 2023/0319481 | A1* | 10/2023 | Wang ..................... | H04R 9/025 381/386 |
| 2023/0328425 | A1* | 10/2023 | Wang ..................... | H04R 9/025 381/335 |

FOREIGN PATENT DOCUMENTS

| | | | |
|---|---|---|---|
| CN | 109168115 | A | 1/2019 |
| CN | 209419838 | U | 9/2019 |
| CN | 111711898 | A | 9/2020 |
| IN | 208675521 | U | 3/2019 |

* cited by examiner

SOUND GENERATING DEVICE MODULE

TECHNICAL FIELD

The present disclosure relates to the technical field of acoustic-electric conversion, and in particular, to a sound generating device module.

BACKGROUND ART

A sound generating device, as a device for people's entertainment at ordinary times, has been put forward higher and higher requirements as people have higher and higher requirements for the quality of life.

As a core component of sound generating devices such as home audio, car audio and electronic device, the sound generating device is widely used in electronic products. The product quality of the sound generating device module itself directly affects the sound generating quality. In recent years, the development trend of electronic products tends to be thinner and smaller. For example, most mobile phone manufacturers may manufacture the mobile phone thinner and thinner, thus the volume of each electronic component in the corresponding mobile phone may be correspondingly compressed. However, such a requirement for structural design will seriously affect the acoustic performance of the sound generating device module, resulting in a defect that the acoustic performance cannot meet the requirements for sound quality.

Therefore, it is necessary to improve the structure of the sound generating device module and optimize the structure in a limited space so as to optimize the acoustic performance.

SUMMARY

An object of the present application is to provide an improved sound generating device module.

According to one aspect, the present application provides a sound generating device module, including:

- a housing having a cavity therein;
- a frame fixedly provided in the cavity, a high-pitch sound generating unit and a low-pitch sound generating unit are respectively provided on opposite sides of the frame;
- a baffle plate is provided on a side of the housing corresponding to the high-pitch sound generating unit, and the baffle plate is fitted with the housing to form a side sound output port corresponding to the high-pitch sound generating unit;
- the sound generating device module is configured to form a front sound output structure for the low-pitch sound generating unit;
- a reinforcement plate is provided in the frame, and the reinforcement plate is interposed between the high-pitch sound generating unit and the low-pitch sound generating unit.

Optionally, an edge of the frame bends and extends towards a direction opposite to the baffle plate to form a first accommodation groove, and at least a part of a structure of the low-pitch sound generating unit is disposed in the first accommodation groove;

- a through hole is provided at a middle of the frame, a side wall of the through hole bends and extends towards a direction of the baffle plate to form a second accommodation groove, and at least a part of a structure of the high-pitch sound generating unit is disposed in the second accommodation groove;
- the reinforcement plate is provided at a bottom of the first accommodation groove, and the first accommodation groove and the second accommodation groove are partitioned by the reinforcement plate.

Optionally, the low-pitch sound generating unit includes a first magnet, a first coil and a first diaphragm, the first magnet is disposed in the first accommodation groove and is fixed on the reinforcement plate, the first diaphragm is disposed on the housing at an opposite side of an opening of the first accommodation groove, a first magnetic gap is provided between the first magnet and a wall of the first accommodation groove, the first coil is connected with the first diaphragm, and the first coil is located in the first magnetic gap.

Optionally, the high-pitch sound generating unit includes a second magnet, a second coil and a second diaphragm, the second magnet is disposed in the second accommodation groove and is fixed on the reinforcement plate, the second diaphragm is disposed on the housing at an opposite side of an opening of the second accommodation groove, a second magnetic gap is provided between the second magnet and a wall of the second accommodation groove, the second coil is connected with the second diaphragm, and the second coil is located in the second magnetic gap.

Optionally, a first sound output hole is provided at a position of the housing corresponding to the opening of the first accommodation groove, and the first diaphragm covers on the first sound output hole;

- a second sound output hole is provided at a position of the housing corresponding to the opening of the second accommodation groove, and the second diaphragm covers on the second sound output hole.

Optionally, an area of the first sound output hole is larger than an area of the second sound output hole.

Optionally, edges of the first diaphragm and edges of the second diaphragm are fixed on the housing;

- a portion of the first diaphragm close to an edge of the first sound output hole is recessed towards inside of the cavity to form a first rim;
- a portion of the second diaphragm close to an edge of the second sound output hole is recessed towards inside of the cavity to form a second rim.

A first stiffening plate and a second stiffening plate are respectively fixed on the first diaphragm and the second diaphragm.

Optionally, a first washer is disposed on a side of the first magnet facing the first diaphragm; and a second washer is disposed on a side of the second magnet facing the second diaphragm.

Optionally, the frame and the housing form a first rear sound cavity and a second rear sound cavity isolated from each other in the cavity, the first rear sound cavity is communicated with the low-pitch sound generating unit, and the second rear sound cavity is communicated with the high-pitch sound generating unit.

The sound generating device module provided by the present application fully utilizes the space occupied by the overall structure thereof, and the high-pitch sound generating unit and the low-pitch sound generating unit share the frame so as to reduce the internal volume of the loudspeaker, while the reinforcement plate is provided in the frame so as to ensure the stability of the internal structure of the sound generating device module.

Other features and advantages of the present application will become apparent from the following detailed description of exemplary embodiments of the present application with reference to the accompanying drawings.

BRIEF DESCRIPTION OF THE DRAWINGS

The accompanying drawings, which are incorporated in and constitute a part of the specification, illustrate embodiments of the present application and, together with the description, serve to explain the principles of the present application.

REFERENCE NUMERALS

Figure 1:
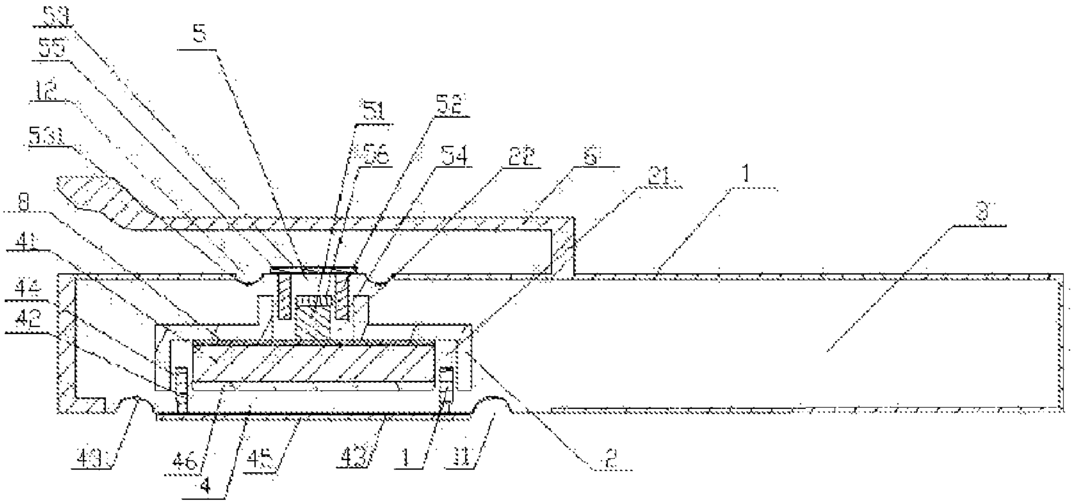
FIG. 1 is a schematic side cross-sectional view of a sound generating device module according to an embodiment of the present application.
Figure 2:
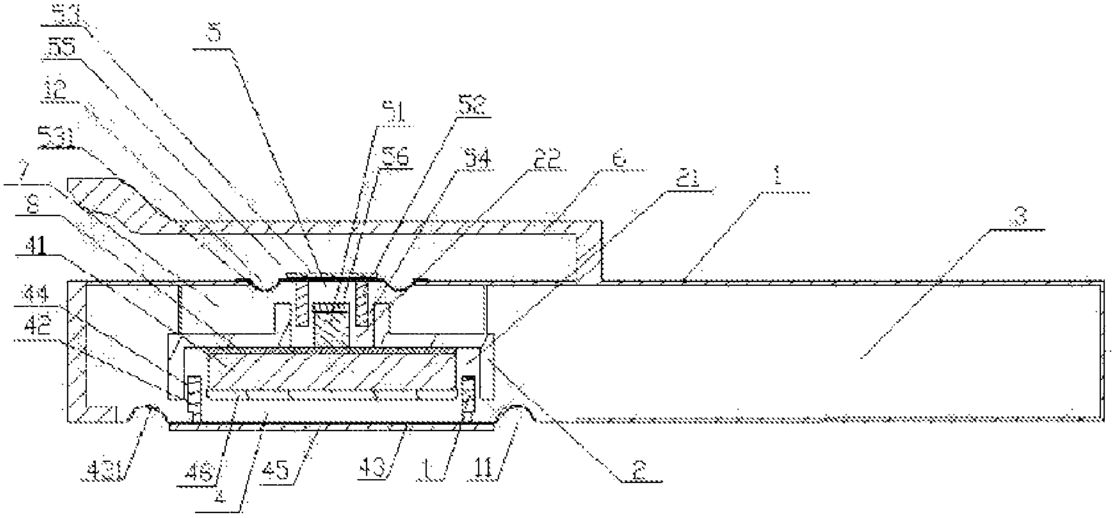
FIG. 2 is a schematic side cross-sectional view of another sound generating device module according to an embodiment of the present application.

1: housing; 11: first sound output hole; 12: second sound output hole; 2: frame; 21: first accommodation groove; 22: second accommodation groove; 3: first rear sound cavity; 4: low-pitch sound generating unit: 41: first magnet; 42: first coil; 43: first diaphragm; 431: first rim; 44: first magnetic gap; 45: first stiffening plate; 46: first washer; 5: high-pitch sound generating unit; 51: second magnet; 52: second coil; 53: second diaphragm; 531: second rim; 54: second magnetic gap; 55: second stiffening plate; 56: second washer; 6: baffle plate; 7: second rear sound cavity; 8: reinforcement plate.

DETAILED DESCRIPTION OF THE EMBODIMENTS

Various exemplary embodiments of the present application will now be described in detail with reference to the accompanying drawings. It should be noted that the relative arrangement of components and steps, numerical expressions and numerical values set forth in these embodiments do not limit the scope of the present application unless specifically stated otherwise.

The following description of at least one exemplary embodiment is merely illustrative and is in no way intended to limit the present application, its application or use.

Techniques, methods, and apparatus known to those skilled in the art may not be discussed in detail, but in appropriate circumstance, such techniques, methods, and apparatus should be considered part of the specification.

In all examples shown and discussed herein, any specific value should be construed as merely exemplary and not as a limitation. Accordingly, other examples of the exemplary embodiments may have different values.

It should be noted that, similar numerals and letters indicate similar items in the following drawings. Therefore, once an item is defined in a drawing, it does not need to be further discussed in subsequent drawings.

The present application provides a sound generating device module, including:

A housing 1 having a cavity therein, the cavity may be used as a rear sound cavity of a high-pitch sound generating unit 5 and a rear sound cavity of a low-pitch sound generating unit 4. The cavity as a whole may be used as a shared common sound cavity for the high-pitch sound generating unit 5 and the low-pitch sound generating unit 4; or, the internal space of the cavity is divided to form a first rear sound cavity 3 and a second rear sound cavity 7, so that the sound cavity of the high-pitch sound generating unit 5 and the sound cavity of the low-pitch sound generating unit 4 is separated.

a frame 2 fixedly provided in the cavity, a high-pitch sound generating unit 5 and a low-pitch sound generating unit 4 are respectively provided on two opposite sides of the frame 2. Generally, since the frame 2 has a large volume, it occupies too much internal space of the sound generating device module, and accordingly, the volume of the module needs to be enlarged to ensure that the sound quality is not damaged. Therefore, in order to further reduce the volume of the sound generating device module, the high-pitch sound generating unit 5 and the low-pitch sound generating unit 4 are disposed on the same frame 2 in opposite directions, which can greatly reduce the volume of the loudspeaker.

A baffle plate 6 is provided on a side of the housing 1 corresponding to the high-pitch sound generating unit 5, and the baffle plate 6 cooperates with the housing to change the sound output direction of the high-pitch sound generating unit 5. The baffle plate 6 cooperates with the housing 1 so that the sound generating device module forms a side sound output port for the high-pitch sound generating unit 5, and thereby the sound generated by the vibration of the high-pitch sound generating unit can be transmitted from the side surface. Optionally, the sound generating device module may be configured to form a front sound output structure for the low-pitch sound generating unit 4, so that the sound of the low-pitch sound generating unit 4 can be transmitted from the front surface. For example, the sound output direction of the high-pitch sound generating unit 5 and the sound output direction of the low-pitch sound generating unit 4 are perpendicular to each other. In order to satisfy different positions of sound output hole of more electronic devices, the sound output direction of the high-pitch sound generating unit 5 is changed to be perpendicular to the sound output direction of the low-pitch sound generating unit 4 through the baffle plate 6, therefore the requirements of different products for sound output positions can be satisfied.

A reinforcement plate 8 is provided in the frame 2, and the reinforcement plate 8 is located between the high-pitch sound generating unit 5 and the low-pitch sound generating unit 4. The reinforcement plate 8 functions to provide a relatively stable installation position for a part of the structure of the suction system of the high-pitch sound generating unit 5, so that the internal structure of the sound generating device module is relatively stable at a whole, and the sound quality of the sound generating device module is guaranteed.

In the technical solution of the present application, the high-pitch sound generating unit 5 and the low-pitch sound generating unit 4 share one frame 2, so as to save the space, and in the meanwhile, using the reinforcement plate 8 to strengthen the structural stability of the high-pitch sound generating unit 5 and the low-pitch sound generating unit 4, so that a high sound quality of the sound generating device module is guaranteed.

Optionally, an edge of the frame 2 bends and extends towards a direction opposite to the baffle plate 6 to form a first accommodation groove 21, and a part of the low-pitch sound generating unit 4 is disposed in the first accommodation groove 21.

The reinforcement plate 8 is provided at the bottom of the first accommodation groove 21, and the first accommodation groove 21 and the second accommodation groove 22 are partitioned by the reinforcement plate 8.

The reinforcement plate 8 provides an area for fixing and installing the high-pitch sound generating unit 5 and the low-pitch sound generating unit 4 while separating the first accommodation groove 21 and the second accommodation groove 22, and in the meanwhile, the reinforcement plate 8 can ensure that the magnetic circuit in the high-pitch sound generating unit 5 and the magnetic circuit in the low-pitch sound generating unit 4 are more stable with respect to each other.

Optionally, the low-pitch sound generating unit 4 includes a first magnet 41, a first coil 42 and a first diaphragm 43, the first magnet 41 is disposed in the first accommodation groove 21 and is fixed on the reinforcement plate 8, the first diaphragm 43 is disposed on the housing 1 at the opposite side of the opening of the first accommodation groove 21, a first magnetic gap 44 is provided between the first magnet 41 and a wall of the first accommodation groove 21, the first coil 42 is connected with the first diaphragm 43, and the first coil 42 is located in the first magnetic gap 44. The reinforcement plate 8 is adopted to fix the first magnet 41, and in the meanwhile, to allow the first magnetic gap 44 to be formed between the first magnet 41 and the wall of the first accommodation groove 21, so that after the first coil 42 disposed in the first magnetic gap 44 is energized, the moving electric charges are subjected to a Lorentz force in the magnetic field, and the first coil 42 vibrates, so as to realize the conversion of electrical energy into mechanical energy, thereby driving the diaphragm to vibrate to generate sound.

Optionally, the high-pitch sound generating unit 5 includes a second magnet 51, a second coil 52 and a second diaphragm 53, the second magnet 51 is disposed in the second accommodation groove 22 and is fixed on the reinforcement plate 8, the second diaphragm 53 is disposed on the housing 1 at the opposite side of the opening of the second accommodation groove 22, a second magnetic gap 54 is provided between the second magnet 51 and a wall of the second accommodation groove 22, the second coil 52 is connected with the second diaphragm 53, and the second coil 52 is located in the second magnetic gap 54. The second magnet 51 is fixed on the reinforcement plate 8, and is disposed in the second accommodation groove 22 in an opposite direction to the first magnet 41. In this case, the direction of transmitting the high-pitch sound through the second diaphragm 53 and the direction of transmitting the low-pitch sound through the first diaphragm 43 are opposite.

Meanwhile, by changing the direction of outputting the high-pitch sound through the baffle plate 6, a rear sound outputting can be changed to a side sound outputting. In order to applicable to more electronic devices, specifically, the baffle plate 6 may be disposed to be detachable, and a side of the housing 1 corresponding to the high-pitch sound generating unit 5 may be provided with a ring-shaped installation position, the baffle plate 6 may be mounted in different positions, so that the sound outputting direction of the high-pitch sound generating unit 5 can be manually adjusted, thereby the sound generating device module is applicable to more electronic devices without redesigning the structure of the sound generating device module, which is more universally used and further reduces costs.

In a limited space, through the arrangement of the reinforcement plate, the supporting force is more evenly distributed and balanced, the material is saved, and the space is fully utilized, so that the first magnet 41 and the second magnet 51 can stably generate magnetic field.

Optionally, a first sound output hole 11 is provided at a position of the housing 1 corresponding to the opening of the first accommodation groove 21, and the first diaphragm 43 covers on the first sound output hole 11; a second sound output hole 12 is provided at a position of the housing 1 corresponding to the opening of the second accommodation groove 22, and the second diaphragm 53 covers on the second sound output hole 12. Specifically, during the vibration of the first diaphragm 43 and the second diaphragm 53, the sound is transmitted from the sound outlet holes.

Optionally, the area of the first sound output hole 11 is larger than the area of the second sound output hole 12. In order to ensure that the high-pitch sound of the sound generating device module is sweetness and transparency and the low-pitch sound of the sound generating device module is surging and shocking, it is necessary to clearly distinguish the high-pitch sound and the low-pitch sound. Thus, the area of the first sound output hole 11 needs to be larger than the area of the second sound output hole 12, and accordingly, the area of the first diaphragm 43 is also larger than the area of the second diaphragm 53. Specifically, the shapes of the first sound output hole 11 and the second sound output hole 12 are not specifically limited, and may be circular shape, waist shape or other holes that can meet the sound requirements. As an example, the first sound output hole 11 and the second sound output hole 12 are circular sound output holes, the first sound output hole 11 and the second sound output hole 12 share the first rear sound cavity 3, the diameter of the first sound output hole 11 is larger than the diameter of the second sound output hole 12, thereby ensuring that the sound output from the first sound output hole 11 is low-pitch sound, the sound output from the second sound output hole 12 is high-pitch sound, thereby realizing the integrity for the gamut of the sound generating device module.

Optionally, edges of the first diaphragm 43 and the second diaphragm 53 are fixed on the housing 1; a portion of the first diaphragm 43 close to an edge of the first sound output hole 11 is recessed towards inside of the cavity to form a first rim 431; a portion of the second diaphragm 53 close to an edge of the second sound output hole 12 is recessed towards inside of the cavity to form a second rim 531. After the first coil and the second coil are energized, electric charges move in the first magnetic gap 44 and the second magnetic gap 54 respectively, the first coil and the second coil vibrate and drive the first diaphragm 43 and the second diaphragm 53 to vibrate, and the first rim 431 and the second rim 531 are used to prevent the first diaphragm 43 and the second diaphragm 53 from being damaged by pulling during the vibration, or prevent that the vibration amplitude is not enough which results in that the high-pitch sound and the low-pitch sound fail to meet the requirements. When the first coil 42 and the second coil 52 vibrate, the first rim 431 and the second rim 531 provide a larger margin for the vibration of the first diaphragm 43 and the second diaphragm 53, so that the sound of the sound generating device module more fidelity.

Generally, the increase of the strength of the magnetic field can improve the sensitivity and the amplitude of the vibration of the diaphragm, thereby improving the acoustic performance of the sound generating device module. The strength of the magnetic field is increased mainly by increasing the magnetism and the volume of the first magnet 41 and the second magnet 51. However, in actual product demand, the overall size of the sound generating device module is generally fixed and cannot be increased arbitrarily, which results in that the first magnet 41 and the second magnet 51 having limited volume cannot generate a strong enough magnetic field and thereby cannot achieve the requirement of the acoustic performance. Therefore, by allowing the low-pitch sound generating unit 4 and the high-pitch sound generating unit 5 to share the same frame 2, the volume of the first magnet 41 and the second magnet 51 can be further increased without increasing the overall volume of the sound generating device module, thereby achieving the required acoustics performance. Or, the volume of the sound generating device module can be further reduced, and accordingly, the sound generating device module is applicable to more electronic devices, or the volume of the electronic devices can be further reduced.

Optionally, a first stiffening plate 45 and a second stiffening plate 55 are respectively fixed on the first diaphragm 43 and the second diaphragm 53. During the vibration of the first diaphragm 43 and the second diaphragm 53, since the diaphragm is made of soft material, the acoustic performance may be lost as the vibration frequency changes. By providing the first stiffening plate 45 and the second stiffening plate 55 on the first diaphragm 43 and the second diaphragm 53 respectively, the diaphragm can be subject to overall and reliable balance restriction, and the possibility of polarization and tilt vibration of the diaphragm is greatly reduced.

Optionally, a first washer is provided on a side of the first magnet 41 facing the first diaphragm 43; and a second washer is provided on a side of the second magnet 51 facing the second diaphragm 53, so as to reduce the possibility of polarization caused by the unbalanced driving force of the whole vibration assembly. By means of the first washer and the second washer, the magnetic field strength and magnetic field uniformity at the magnetic gap are further improved, and a uniform and stronger magnetic field is formed in the magnetic gap, so that the first coil 42 and the second coil 52 can receive an improved magnetic field in each area along the circumferential direction thereof, thereby improving the acoustic performance of the sound generating device module.

Optionally, the frame 2 and the housing 1 form a first rear sound cavity 3 and a second rear sound cavity 7 in the cavity. The housing 1 may be provided with structures such as a protrusion, a baffle wall in the cavity, and the frame 2 can be fitted with the above-mentioned structures such as the protrusion, the baffle wall to divide the cavity into the first rear sound cavity 3 and the second rear sound cavity 7 by cooperating with the internal structure of the housing 1. The first rear sound cavity 3 is communicated with the low-pitch sound generating unit 4, and the second rear sound cavity 7 is communicated with the high-pitch sound generating unit 5. The first rear sound cavity 3 and the second rear sound cavity 7 isolated from each other are not communicated with each other, and the first rear sound cavity 3 and the second rear sound cavity 7 are respectively used as the rear sound cavity of the low-pitch sound generating unit 4 and the high-pitch sound generating unit 5, so as to provide the sound generating unit with the acoustic effect of rear cavity resonance and sound absorption. In this embodiment, each of the high-pitch sound generating unit 5 and the low-pitch sound generating unit 4 has a separate rear cavity, a separate second rear sound cavity 7 is configured as a cavity specially used by the high-pitch sound generating unit 5 to prevent the interference with the low-pitch sound generating unit 4. Since the first coil 42 and the second diaphragm 53 have small amplitudes in the high-pitch sound generating unit 5, the volume of the second rear sound cavity 7 does not need to be too large as long as the second rear sound cavity 7 can enclose the second magnet 51, the second coil 52 and the second diaphragm 53 inside thereof.

Optionally, the second rear sound cavity 7 may have a specific structure in which a ring-shaped partition plate is provided on a side of the frame 2 corresponding to the second sound output hole 12, and the partition plate has one end connected to the frame 2 and the other end thereof is connected to an inner wall of the housing 1, which improves the stability of the frame 2 without increasing the internal space of the sound generating device module. The diameter of the second rear sound cavity 7 enclosed by the partition plate is larger than the diameter of the second diaphragm 53 and larger than the diameter of the second accommodation groove 22.

Although some specific embodiments of the present application have been described in detail by way of examples, those skilled in the art should understand that the above examples are for illustration only and not for the purpose of limiting the scope of the present application. It will be understood by those skilled in the art that the above embodiments can be modified without departing from the scope and spirit of the present application. The scope of the present application is defined by the appended claims.

What is claimed is:

1. A sound generating device assembly, comprising:

a housing having a cavity therein; and a frame fixedly provided in the cavity, a high-pitch sound generator and a low-pitch sound generator are respectively provided on two opposite sides of the frame;

wherein a baffle plate is provided on a side of the housing corresponding to the high-pitch sound generator, and the baffle plate and the housing together form a side sound output port corresponding to the high-pitch sound generator;

wherein the sound generating device assembly is configured to form a front sound output structure for the low-pitch sound generator; and wherein a reinforcement plate is provided in the frame, and the reinforcement plate is interposed between the high-pitch sound generator and the low-pitch sound generator.

2. The sound generating device assembly of claim 1, wherein an edge of the frame bends and extends towards a direction opposite to the baffle plate to form a first accommodation groove, and at least a part of a structure of the low-pitch sound generator is disposed in the first accommodation groove;

wherein a through hole is provided at a middle of the frame, a side wall of the through hole bends and extends towards a direction of the baffle plate to form a second accommodation groove, and at least a part of a structure of the high-pitch sound generator is disposed in the second accommodation groove; and wherein the reinforcement plate is provided at a bottom of the first accommodation groove, and the first accommodation groove and the second accommodation groove are partitioned by the reinforcement plate.

3. The sound generating device assembly of claim 2, wherein the low-pitch sound generator comprises a first magnet, a first coil and a first diaphragm, the first magnet is disposed in the first accommodation groove and is fixed on the reinforcement plate, the first diaphragm is disposed on the housing at an opposite side of an opening of the first accommodation groove, a first magnetic gap is provided between the first magnet and a wall of the first accommodation groove, the first coil is connected with the first diaphragm, and the first coil is located in the first magnetic gap.

4. The sound generating device assembly of claim 3, wherein the high-pitch sound generator comprises a second magnet, a second coil and a second diaphragm, the second magnet is disposed in the second accommodation groove and is fixed on the reinforcement plate, the second diaphragm is disposed on the hosing at an opposite side of an opening of the second accommodation groove, a second magnetic gap is provided between the second magnet and a wall of the second accommodation groove, the second coil is connected with the second diaphragm, and the second coil is located in the second magnetic gap.

5. The sound generating device assembly of claim 4, wherein a first sound output hole is provided at a position of the housing corresponding to the opening of the first accommodation groove, and the first diaphragm covers on the first sound output hole; and a second sound output hole is provided at a position of the housing corresponding to the opening of the second accommodation groove, and the second diaphragm covers on the second sound output hole.

6. The sound generating device assembly of claim 5, wherein an area of the first sound output hole is larger than an area of the second sound output hole.

7. The sound generating device assembly of claim 5, wherein edges of the first diaphragm and edges of the second diaphragm are fixed on the housing;

a portion of the first diaphragm close to an edge of the first sound output hole is recessed towards inside of the cavity to form a first rim; and a portion of the second diaphragm close to an edge of the second sound output hole is recessed towards inside of the cavity to form a second rim.

8. The sound generating device assembly of claim 5, wherein a first stiffening plate and a second stiffening plate are respectively fixed on the first diaphragm and the second diaphragm.

9. The sound generating device assembly of claim 4, wherein a first washer is disposed on a side of the first magnet facing the first diaphragm; and a second washer is disposed on a side of the second magnet facing the second diaphragm.

10. The sound generating device assembly of claim 1, wherein the frame and the housing form a first rear sound cavity and a second rear sound cavity isolated from each other in the cavity, the first rear sound cavity is communicated with the low-pitch sound generator, and the second rear sound cavity is communicated with the high-pitch sound generator.

* * * * *